US008638050B2

(12) United States Patent
Kato et al.

(10) Patent No.: US 8,638,050 B2
(45) Date of Patent: Jan. 28, 2014

(54) DC POWER SUPPLY UNIT AND LED LIGHTING APPARATUS

(75) Inventors: Go Kato, Yokosuka (JP); Hiroshi Kubota, Yokosuka (JP); Masahiko Kamata, Yokosuka (JP); Hiroshi Terasaka, Yokosuka (JP); Tomokazu Usami, Yokosuka (JP); Naoko Iwai, Yokosuka (JP)

(73) Assignee: Toshiba Lighting and Technology Corporation, Kanagawa (JP)

( * ) Notice: Subject to any disclaimer, the term of this patent is extended or adjusted under 35 U.S.C. 154(b) by 151 days.

(21) Appl. No.: 13/106,487

(22) Filed: May 12, 2011

(65) Prior Publication Data

US 2011/0279062 A1 Nov. 17, 2011

(30) Foreign Application Priority Data

May 14, 2010 (JP) ................................ 2010-112154
Jul. 2, 2010 (JP) ................................ 2010-151895

(51) Int. Cl.
*H05B 37/02* (2006.01)
*H02H 7/12* (2006.01)

(52) U.S. Cl.
USPC ............................................ 315/307; 363/50

(58) Field of Classification Search
None
See application file for complete search history.

(56) References Cited

U.S. PATENT DOCUMENTS 6,113,760 A * 9/2000 Kuriyama et al. ....... 204/298.03
6,147,458 A 11/2000 Bucks
6,949,892 B2 9/2005 Horiuchi
7,321,206 B2 1/2008 Kang
2003/0042437 A1 3/2003 Worley
2007/0159750 A1 * 7/2007 Peker et al. ................. 361/93.1
2009/0015174 A1 1/2009 Huang
2010/0001663 A1 1/2010 Wu
2010/0090618 A1 4/2010 Veltman
2010/0117656 A1 5/2010 Snelten
2011/0050129 A1 3/2011 Rudolph
2011/0085335 A1 4/2011 Osawa
2011/0089846 A1 4/2011 Ido
2011/0109230 A1 5/2011 Simi

FOREIGN PATENT DOCUMENTS

CN 101669405 3/2010
JP 10-46324 2/1998
JP 10-149888 6/1998
JP 11-087072 3/1999

(Continued)

OTHER PUBLICATIONS

English language abstract of JP 2008-210537, published Sep. 11, 2008.

(Continued)

*Primary Examiner* — Crystal L Hammond
(74) *Attorney, Agent, or Firm* — DLA Piper LLP (US)

(57) ABSTRACT

In one embodiment, a DC power supply unit includes a DC power supply source; a load circuit connected to an output end of the DC power supply source; a load state detection device to detect a load voltage or an electric quantity corresponding to the load voltage; and a control device to receive the detected output of the load state detection device. The control device controls a maximum output voltage of the DC power supply source so that the voltage difference between the maximum output voltage of the DC power supply source and the load voltage at the time of normal operation falls within a predetermined range in which arc discharge is suppressed.

6 Claims, 3 Drawing Sheets

(56) References Cited

FOREIGN PATENT DOCUMENTS

| | | |
|---|---|---|
| JP | 2000-260578 | 9/2000 |
| JP | 2001-210478 | 8/2001 |
| JP | 2002-231471 | 8/2002 |
| JP | 2003-157986 | 5/2003 |
| JP | 2004-119078 | 4/2004 |
| JP | 2004-327152 | 11/2004 |
| JP | 2005-011739 | 1/2005 |
| JP | 2005-129512 | 5/2005 |
| JP | 2005-142137 | 6/2005 |
| JP | 2006-108117 | 4/2006 |
| JP | 2006-269349 | 10/2006 |
| JP | 2006-351496 | 12/2006 |
| JP | 2007-6658 | 1/2007 |
| JP | 2007-59635 | 3/2007 |
| JP | 2007-142057 | 6/2007 |
| JP | 2007-234415 | 9/2007 |
| JP | 2007-281424 | 10/2007 |
| JP | 2007-538378 | 12/2007 |
| JP | 2008-053695 | 3/2008 |
| JP | 2008-210537 | 9/2008 |
| JP | 2008-310963 | 12/2008 |
| JP | 2009-10100 | 1/2009 |
| JP | 2009-33098 | 2/2009 |
| JP | 2009-189170 | 8/2009 |
| JP | 2009-218528 | 9/2009 |
| JP | 2009-266599 | 11/2009 |
| JP | 2010-021109 | 1/2010 |
| JP | 2010-110157 | 5/2010 |
| KR | 10-0884279 | 2/2009 |
| TW | 2010 17042 | 5/2010 |
| WO | WO 00/02421 | 1/2000 |
| WO | WO 2005/115058 | 12/2005 |
| WO | WO 2008/132661 | 11/2008 |
| WO | WO 2009/001279 | 12/2008 |
| WO | WO 2009/89919 | 7/2009 |
| WO | WO 2010/005291 | 1/2010 |
| WO | WO 2010/007985 | 1/2010 |
| WO | WO 2010/050659 | 6/2010 |

OTHER PUBLICATIONS

Machine English language translation of JP 2008-210537, published Sep. 11, 2008.
English language abstract of JP-2008-053695 published Mar. 6, 2008.
Machine English language translation of JP-2008-053695 published Mar. 6, 2008.
English language abstract of JP-2007-538378 published Dec. 27, 2007.
Machine English language translation of JP-2007-538378 published Dec. 27, 2007.
English language abstract of JP 2005-11739 published Jan. 13, 2005.
Machine English language translation of JP 2005-11739 published Jan. 13, 2005.
English language abstract of JP 11-087072 published Mar. 30, 1999.
Machine English language translation of JP 11-087072 published Mar. 30, 1999.
English Language Abstract of JP 2009-218528 Published Sep. 24, 2009.
English Language Translation of JP 2009-218528 Published Sep. 24, 2009.
English Language Abstract of JP 2004-119078 Published Apr. 15, 2004.
English Language Translation of JP 2004-119078 Published Apr. 15, 2004.
English Language Abstract of JP 2007-6658 Published Jan. 11, 2007.
English Language Translation of JP 2007-6658 Published Jan. 11, 2007.
English Language Abstract of JP 2003-157986 Published May 30, 2003.
English Language Translation of JP 2003-157986 Published May 30, 2003.
English Language Abstract of JP 2008-310963 Published Dec. 25, 2008.
English Language Translation of JP 2008-310963 Published Dec. 25, 2008.
International Search Report issued in PCT/JP2009/055871 on Jun. 9, 2009.
English Language Abstract of JP 2002-231471 Published Aug. 15, 2002.
English Language Translation of JP 2002-231471 Published Aug. 15, 2002.
English Language Abstract of JP 2004-327152 Published Nov. 18, 2004.
English Language Translation of JP 2004-327152 Published Nov. 18, 2004.
English Language Abstract of JP 2005-129512 Published May 19, 2005.
English Language Translation of JP 2005-129512 Published May 19, 2005.
English Language Abstract of JP 2007-234415 Published Sep. 13, 2007.
English Language Translation of JP 2007-234415 Published Sep. 13, 2007.
English Language Abstract of JP 2001-210478 Published Aug. 3, 2001.
English Language Translation of JP 2001-210478 Published Aug. 3, 2001.
English Language Abstract of JP 2006-269349 Published Oct. 5, 2006.
English Language Translation of JP 2006-269349 Published Oct. 5, 2006.
International Search Report issued in PCT/JP2009/055873 on Jun. 9, 2009.
Japanese Office Action issued in JP 2008-076837 on Jul. 6, 2010.
English Translation of Japanese Office Action issued in JP 2008-076837 on Jul. 6, 2010.
English Language Abstract of JP 2006-108117 published Apr. 20, 2006.
Machine Translation of JP 2006-108117 published Apr. 20, 2006.
English Language Abstract of JP 2008-281424 published Nov. 20, 2008.
Machine Translation of JP 2008-281424 published Nov. 20, 2008.
Japanese Office Action issued in JP 2008-076835 on Aug. 24, 2010.
English Translation of Japanese Office Action issued in JP 2008-076835 on Aug. 24, 2010.
English Language Abstract of JP 2005-142137 published Jun. 2, 2005.
English Language Translation of JP 2005-142137 published Jun. 2, 2005.
U.S. Appl. No. 12/942,055 as of Dec. 3, 2012.
U.S. Appl. No. 13/013,271 as of Dec. 3, 2012.
U.S. Appl. No. 13/162,678 as of Dec. 3, 2012.
U.S. Appl. No. 13/169,748 as of Dec. 3, 2012.
U.S. Appl. No. 13/218,767 as of Dec. 3, 2012.
English Language Abstract of JP 2009-10100 published Jan. 15, 2009.
English Language Translation of JP 2009-10100 published Jan. 15, 2009.
English Language Abstract of JP 2000-260578 published Sep. 22, 2000.
English Language Translation of JP 2000-260578 published Sep. 22, 2000.
English Language Abstract of JP 2010-110157 published May 13, 2010.
English Language Translation of JP 2010-110157 published May 13, 2010.
Japanese Office Action issued on Nov. 21, 2011 in JP 2010-015159.
English Language Translation of Japanese Office Action issued on Nov. 21, 2011 in JP 2010-015159.
English Language Abstract of JP 2009-266599 published Nov. 12, 2009.
English Language Translation of JP 2009-266599 published Nov. 12, 2009.
English Language Abstract of JP 10-149888 published Jun. 6, 1998.

(56) References Cited

OTHER PUBLICATIONS

English Language Translation of JP 10-149888 published Jun. 6, 1998.
English Language Abstract of JP 2009-033098 published Feb. 12, 2009.
English Language Translation of JP 2009-033098 published Feb. 12, 2009.
English Language Abstract of WO 2009/089919 published Jul. 23, 2009.
English Language Abstract of JP 2009-189170 published Aug. 20, 2009.
English Language Translation of JP 2009-189170 published Aug. 20, 2009.
English Language Abstract of JP 10-046324 published Feb. 17, 1998.
English Language Translation of JP 10-046324 published Feb. 17, 1998.
English Language Abstract of JP 2007-059635 published Mar. 8, 2007.
English Language Translation of JP 2007-059635 published Mar. 8, 2007.
English Language Abstract of JP 2007-142057 published Jun. 7, 2007.
English Language Translation of JP 2007-142057 published Jun. 7, 2007.
European Search Report issued in EP 11166087 on Oct. 20, 2011.
European Search Report issued in EP 11177418 on Dec. 6, 2011.
English Language Abstract of TW 2010-17042 published on May 1, 2010.
Extended European Search Report issued in EP 11171024 on Dec. 1, 2011.
Korean Office Action issued in KR 10-2011-0060215 on Sep. 1, 2012.
English Language Translation of Korean Office Action issued in KR 10-2011-0060215 on Sep. 1, 2012.
English Language Abstract of KR 10-0884279 published Feb. 17, 2009.
English Language Abstract of JP 2006-351496 published Dec. 28, 2006.
English Language Translation of JP 2006-351496 published Dec. 28, 2006.
English Language Abstract of JP 2010-021109 published Jan. 28, 2010.
English Language Translation of JP 2010-021109 published Jan. 28, 2010.
Japanese Office Action issued in JP2010-015159 on Nov. 7, 2012.
English Language Translation of Japanese Office Action issued in JP2010-015159 on Nov. 7, 2012.
Japanese Office Action issued in 10-2011-0060739 dated Oct. 24, 2012.
English Lanuage Translation of Japanese Office Action issued in Oct. 2011-0060739 dated Oct. 24, 2012.
Chinese Office Action issued in CN 20111022452.3 dated Jul. 25, 2013.
English Language Translation of Chinese Office Action issued in CN 20111022452.3 dated Jul. 25, 2013.
English Language Abstract of CN 101669405 published Mar. 10, 2010.
U.S. Appl. No. 12/942,055 as of Aug. 26, 2013.
U.S. Appl. No. 13/013,271 as of Aug. 26, 2013.
U.S. Appl. No. 13/162,678 as of Aug. 26, 2013.
U.S. Appl. No. 13/169,748 as of Aug. 26, 2013.
U.S. Appl. No. 12/942,055.
U.S. Appl. No. 13/013,271.
U.S. Appl. No. 13/162,678.
U.S. Appl. No. 13/218,767.

* cited by examiner

DC POWER SUPPLY UNIT AND LED LIGHTING APPARATUS

CROSS-REFERENCE TO RELATED APPLICATION

This application is based upon and claims the benefit of priority from Japanese Patent Applications No. P2010-112154, filed May 14, 2010, and P2010-151895, filed Jul. 2, 2010, the entire contents of which are incorporated herein by reference.

FIELD

Embodiments described herein relate generally to a DC power supply unit and LED lighting apparatus.

BACKGROUND

In the LED lighting apparatus for lighting by connecting two or more. LEDs in series with a constant current source, arc discharge occurs in a circuit by open mode failures, such as detachment of each terminal portion, loose connection, disconnection in the circuit and opening of bonding wires of the LEDs. When the arc discharge is detected by rise of an output voltage of the constant current source, it has been known to provide a control unit to stop the supply of direct current.

In an arc discharge characteristics between electric contacts, it is known that a minimum arc voltage Vm and minimum arc current Im almost agree with a voltage value 13V, and a current value 0.43 A of Holm, respectively in case copper is used, as material of the contacts.

Inventors found out that the arc discharge is suppressed at the time of open mode failures of a load circuit under condition in which a voltage difference between a maximum output voltage of a DC power supply source and a load voltage at the time of normal operation is less than 20V as a result of their investigation, and research.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
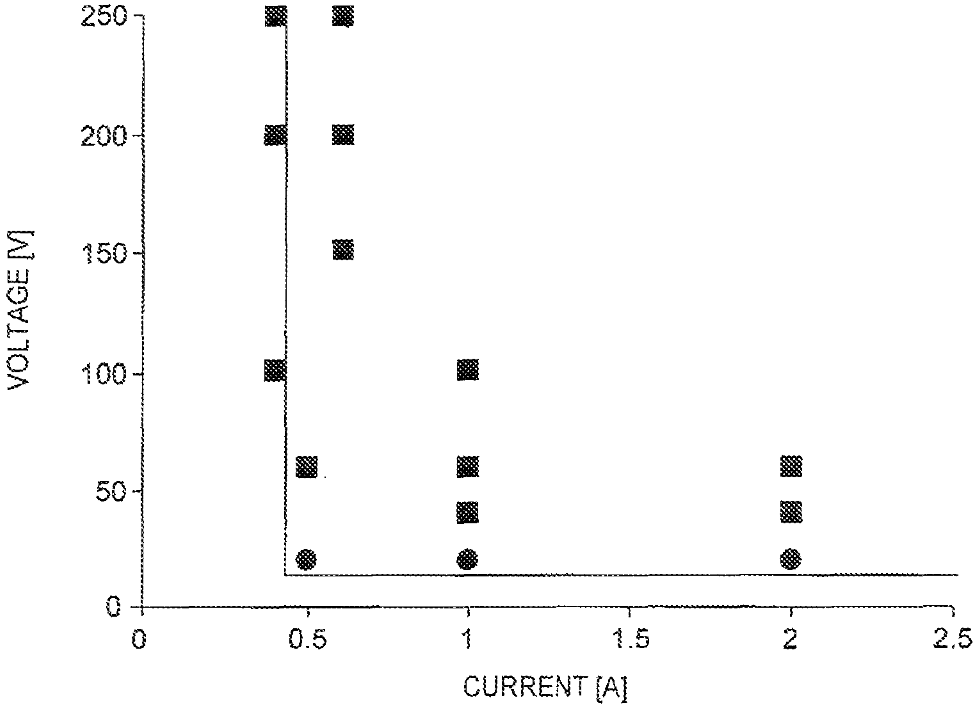
FIG. 1 is a graph showing a result of an arc test between contacts using copper.

A DC power supply unit and LED lighting apparatus according to an exemplary embodiment of the present invention will now be described with reference to the accompanying drawings wherein the same or like reference numerals designate the same or corresponding portions throughout the several views.

In one embodiment, a DC power supply unit includes: a DC power supply source; a load circuit connected to an output end of the DC power supply source; a load state detection device that detects a load voltage or an electric quantity corresponding to the load voltage; and a control device that controls a maximum output voltage of the DC power supply source upon receiving the detected output of the load state detection device so that the voltage difference between the maximum output voltage of the DC power supply source and the load voltage at the time of normal operation falls within a predetermined range in which arc discharge is suppressed.

Hereafter, an embodiment is explained, with reference to drawings. First, an arc test using copper contacts and its result by inventors are explained referring to FIG. 1. In this test, the output voltage of the DC power supply unit is set to various values, and the test is conducted by setting the current which flows into the copper contacts forming a closed loop to various values by adjusting a current-limiting resistor. It is distinguished under above setting condition whether the arc discharge is generated between the copper contacts when the copper contacts are opened with sufficiently slow velocity. A horizontal axis shows current (A), and a vertical axis shows voltage (V), respectively in FIG. 1.

In the result of the test, "the arc discharge has not occurred" is defined as follows. That is, when the copper contacts break, it is a case where the arc discharge occurs momentarily and disappears soon. If this is expressed as a numerical value, when the voltage difference between the output voltage of the DC power supply unit and the load voltage under normal operation is less about 20V, the arc discharge disappears in about several μs. In such a case, the fault resulted by the arc discharge does not arise. In FIG. 1, ● shows a measured point in which the arc, discharge was suppressed.

On the other hand, "the arc discharge has occurred" is defined as follows. That is, if the above-mentioned voltage exceeds 20V, the arc discharge duration becomes long and may continue about several ms. Thus, in case the arc duration becomes long, a possibility that the fault over the circumference, for example, circumference burn with the arc discharge may be increased. In FIG. 1, ■ shows a measured point in which the arc discharge occurred. In addition, a heavy straight line parallel to the horizontal axis shows the minimum arc voltage 13V of Holm. Moreover, the heavy straight line parallel to the vertical axis shows the minimum arc current 0.43 A of Holm. In addition, according to the above-mentioned arc test, when the voltage is more than 100V, it turns out that the arc discharge has occurred below the minimum arc current 0.43 A.

As apparent from FIG. 1, in case the voltage is 20V and the measured current range is 0.5 A-2.0 A, when the copper contact breaks, the arc discharge did not occur. However, in case the voltage is over 20V, the arc discharge occurred. The present embodiment can be drawn from the above arc test. Namely, when the open mode failure occurs in the load circuit connected with the DC power supply unit, in case the voltage difference between the detected output by a load state detection device and the load voltage falls in a predetermined range (for example, in a range in which the voltage difference between a maximum value of the output voltage of the DC power supply unit and, the load voltage at the time of normal operation is less than 20V), the generation of the arc discharge can be suppressed.

Figure 2:
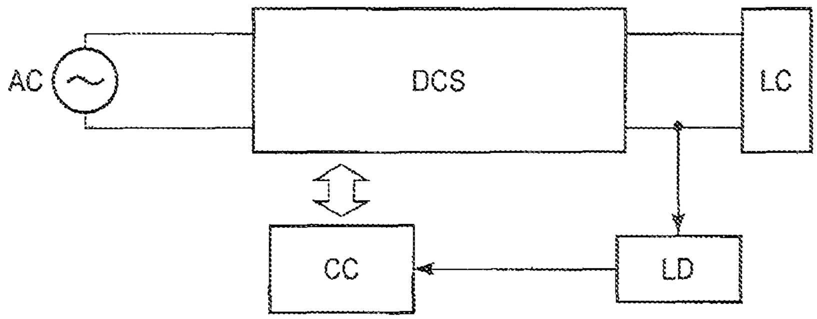
FIG. 2 is a circuit block diagram showing a DC power supply unit according to a first embodiment.

Next, a first embodiment is explained with reference to FIG. 2. In this embodiment, the DC power supply unit includes a DC power supply source DCS, a load circuit LC, a load state detection device LD, and a control device CC, and electric power is supplied to the DC power supply source DCS from a commercial alternating-current source AC.

The DC power supply source DCS is equipped with a rectification circuit, etc. The rectification circuit is configured by a bridge type full-wave rectification circuit, etc. whose alternating input terminal is connected to the commercial alternating current source AC, and outputs a smoothed DC voltage, for example. In addition, the DC power supply source DCS is equipped with a constant current circuit, if necessary. In this embodiment, the output of the DC power supply source DCS is made to a constant current by inputting the DC output of the rectification circuit into a chopper circuit using a constant current control system. Therefore, the DC current made constant from the output terminal of the DC power supply source. DCS is supplied to the load circuit. LC which will be mentioned later.

The DC power supply source has an output voltage characteristics which can output the maximum voltage higher than the load voltage at the time of normal operation. For example, although the constant current source also satisfies the above-mentioned conditions, the DC power supply source is not limited to the constant current source in this embodiment. Here, the load voltage under the normal operation means a voltage drop produced in the load circuit when the load circuit operates normally, and the arc discharge is suppressed. The maximum output voltage is the maximum voltage which the DC power supply unit can output. In addition, the maximum output voltage is that higher than the load voltage at the time of normal operation. For example, in the case of a constant current control system, if the arc discharge occurs in the load circuit at the time of open mode failure in the load circuit, the output voltage of the DC power supply source rises due to the change of the load voltage, for example, the increase of an apparent load voltage seen from the output end side of the DC power supply source DCS. However, since the maximum output voltage is controlled so that the maximum output voltage is set within the predetermined range by a control device CC in this embodiment, even if the load circuit LC requires higher voltage, the output voltage value does not exceed the maximum voltage.

The DC power supply unit in this embodiment includes the control device CC to regulate the maximum output voltage of the DC power supply source DCS so that the voltage difference between the maximum output voltage of the DC power supply source DCS and the load voltage at the time of normal operation falls within the above-mentioned predetermined range.

Moreover, a known circuit composition, such as a DC-DC converter can be used for the DC power supply source DCS. Various chopper circuits are suitable as the DC-DC converter because conversion efficiency is high and its control is easy. The DC-DC converter is equipped with a DC input power supply source and DC voltage conversion portion, and converts an input DC voltage into a direct current having different voltage value. Then, the output voltage of the DC voltage conversion portion is applied to the load circuit LC.

The load circuit LC is configured by two or more LEDs connected in series. The both ends of the load circuit CC are connected to the output end of the DC power supply source DCS so that the LEDs are connected in a forward direction.

In this embodiment, there is no limitation in the amount of the load voltage at the time of normal operation. The load voltage at the time of normal operation may be a rated load voltage, and may be also the load voltage reduced by a desired voltage value from the rated load voltage. Inventors found out that the arc discharge occurs at the time of the open mode failure in the load circuit LC depending on the amount of the voltage difference between the maximum output voltage of the DC power supply source DCS and the load voltage at the time of normal operation, but not depending on the amount of the load voltage as mentioned-above. In addition, the load voltage at the time of normal operation is a voltage drop produced in the load circuit LC in the state where the arc discharge is suppressed, and the load is made regardless of whether the load is in a rated load voltage state or not.

Moreover, in case the load is constituted by LEDs, it is general the load voltage is set so that the load voltage becomes higher according to the number of LEDs connected in series. In the case where the load is composed of LEDs as one example; the load voltage is generally set to a voltage value less than 120V, and preferably may be set to a voltage value less than about 60V. However, in this embodiment, the load circuit LC may be constituted by single LED, for example.

The load state detection device LD is constituted by a load voltage detection circuit in this embodiment. The load voltage detection circuit outputs a voltage proportional to the load voltage as a load state detection signal by connecting a resistor divider, which is not illustrated, in parallel with the load circuit LC, for example.

The load state detection device LD includes a device to detect the load voltage or electric quantity corresponding to the load voltage, such as the load current and electric power. The detected output is inputted directly or indirectly to the control device CC to be mentioned later. As mentioned-above, the state of the load circuit LC is detected not only by the load voltage, but may be detected by the electric quantity corresponding to the voltage, such as the load current and electric power. In short, the load state detection device LD can detect the effective electric quantity according to the characteristics of the DC power supply source DCS. For example, in case the DC power supply source DCS is configured by a constant current source, since the load current is controlled so as to have a constant, level, the load voltage may be detected directly, or the load electric power may be detected.

In addition to the above-mentioned load voltage, detection device, a load current detection device to detect the load current, a current corresponding to the load current, or electric quantity corresponding to the load current can be used for the loading, state detection device LD. The load current detection device can be used when the DC power supply source DCS controls the load with the constant current source, or when performing a constant voltage control of the load circuit LC in a load characteristic range. Furthermore, the load current detection device can be also used when adding a safety circuit function to the control device CC to be mentioned later.

The control circuit CC controls the output voltage of the DC power supply source DCS by controlling the chopper circuit in the DC power supply source DCS so that the voltage difference between the maximum output voltage of the DC power supply source DCS and load voltage at the time of normal operation of the load circuit LC is set within the predetermined range by comparing the load state detection signal inputted to the control circuit CC with the load voltage at the time of normal operation.

By setting an excess voltage detection level to a suitable value, the control device CC controls the above-mentioned output voltage of the DC power supply DCS so that the voltage difference between the maximum output voltage of the DC power supply DCS and the load voltage at the time of the normal operation falls within the above-mentioned predetermined range when the open mode failure occurs and the detected output of the load state detection device LD is inputted. The control is performed without delay. As a result, even if the arc discharge occurs by open mode failure, the arc discharge disappears instantaneously. In order to perform the above control, feedback control of the output voltage of the DC power supply source DCS can be also performed, for example, using a comparator, a voltage limiter circuit, etc.

The excess voltage detection level for controlling the maximum output voltage corresponding to the amount of the load voltage at the time of the normal operation can be changed automatically. In this case, it is preferable to provide an excess voltage detection level setting device and an output voltage control device. The excess voltage detection level setting device can change the excess voltage detection level according to the amount of the load voltage at the time of normal operation. In addition, the excess voltage detection level can be set, for example, to about 120% of the load voltage at the time of normal operation, although the detection level is not limited to specific one. When the load voltage exceeds the excess voltage detection level, the output voltage control device CC controls the DC power supply source DCS so that the DC power supply source DCS outputs the voltage in which the voltage in the above-mentioned predetermined range is added to the load voltage at the time of normal operation as the maximum output voltage. Furthermore, when the load voltage exceeds the excess voltage, it is also possible to control so as to suspend the output of the DC power supply source DCS.

However, in case the load voltage does not change, the excess voltage detection level can be also beforehand set to a fixed value in a manufacturing step of the DC electric power unit. Thereby, the composition of the control device CC can be simplified. Moreover, it is also possible to constitute the excess voltage setting device so that a variable setup of the excess voltage detection level is carried out with manual operation.

In this embodiment, the voltage difference between the maximum output voltage of the DC power supply source DCS and the load voltage at the time of normal operation is less than 20V preferably. More preferably, the voltage difference is in the range of 13V-20V. In addition, although the voltage difference may be less than the 13V as the lower limit of the above-mentioned predetermined range, the difference with the load voltage becomes smaller and the accuracy of the maximum voltage detection falls easily. Accordingly, it is preferable that the lower limit of the range is set to 13V.

That is, in case the lower limit in the predetermined range of the voltage difference is 13V, even if the load voltage at the time of normal operation is comparatively high, for example, beyond about 40V, it becomes difficult to produce detection malfunction. However, when the load voltage at the time of normal operation is about 20V, for example, even if the lower limit is lower than 13V, for example, about 10V or less than 10V, it becomes possible to detect the occurrence of the arc discharge without malfunction like the above case. For this reason, it is also possible to set up the maximum voltage of the DC power supply, source DCS so that the lower limit of the predetermined range changes according to the amount of the load voltage at the time of normal operation. Moreover, when detection accuracy does not become a problem, it may be possible to set the lower limit to a voltage value less than 13V.

Moreover, the control device CC can be constituted using any one of an analog circuit device, a digital circuit device, and a soft-ware.

Figure 3:
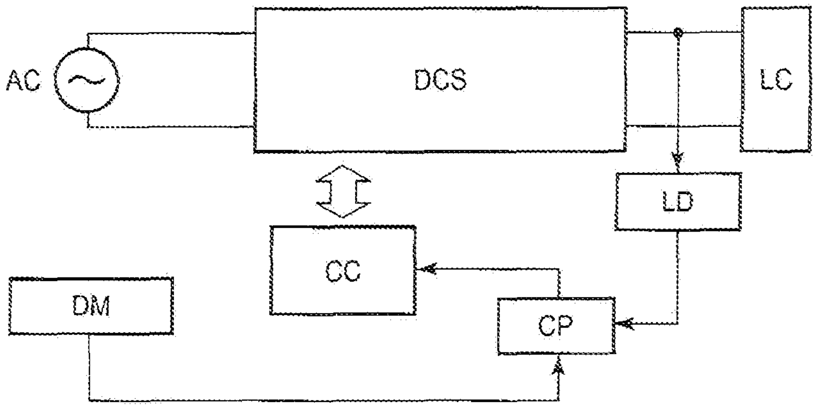
FIG. 3 is a circuit block diagram showing a DC power supply unit according to a second embodiment.

A second embodiment is explained with reference to FIG. 3. The same mark or symbol is given to the same portion as FIG. 2 and explanation about the portion is omitted. This embodiment is different from the first embodiment in the point that the LEDs are constituted so that the output light of the LEDs is changeable, i.e., modulated light may be formed by the LEDs of the load circuit LC by a hard composition.

In this embodiment, a comparator CP is provided between the load state detection device LD and control device CC. In the comparator CP, the control signal of the detected output of the load state detection device LD is compared with the control signal of a control signal generating circuit DM, i.e., a modulated light signal generating circuit. Since a reference potential of the comparison circuit CP changes according to the control signal of the modulated light signal generating circuit DM, the feed-back signal outputted from the comparison circuit CP changes according to the control signal. As a result, since the output voltage of the chopper circuit of the DC power supply source DCS is controlled by the control device. CC, etc., and changes according to the control signal of the control device CC, electric power which the load circuit LC consumes changes according to the control signal.

Moreover, the voltage difference between the maximum voltage which the DC power supply source DCS outputs and the load voltage at the time of normal operation is always held at the predetermined range in the case of variable control of the load circuit LC by the control signal of the control device CC. Therefore, even if the open mode failure occurs during the modulated lighting, the arc discharge is suppressed.

In addition, the DC power supply source DCS can be also constituted so that the constant voltage control is performed within a range of low electric power in the characteristic curve of the LED, i.e., a deep modulation light range, and that a constant current control is performed in other range so as to have a compound characteristic.

A third embodiment is explained with reference to FIG. 4. The same mark or symbol is given to the same portion as FIG. 3 and explanation about the portion is omitted. This embodiment is different in the point that the load circuit LC is constituted by a composition like a soft-ware so that variable control i.e., the modulated lighting operation is possible.

That is, in this embodiment, a portion of the control device CC is constituted by digital devices, such as a microcomputer and DSP. The digital devices are equipped with a CPU and memory, and is constituted by the composition like software to control the load, circuit LC so that variable control of the load circuit the modulated lighting is possible.

The above-mentioned digital device has a computing equation or the data table ST in the memory, and is constituted so that the maximum data of the output voltage of the DC power supply source DCS according to the modulated light control signal level is outputted to the CPU so as to control the DC power supply source DCS. Accordingly, the voltage difference with the load voltage at the time of normal operation is maintainable so that the output voltage of the DC power supply source DCS becomes always constant according to the control signal.

Figure 5:
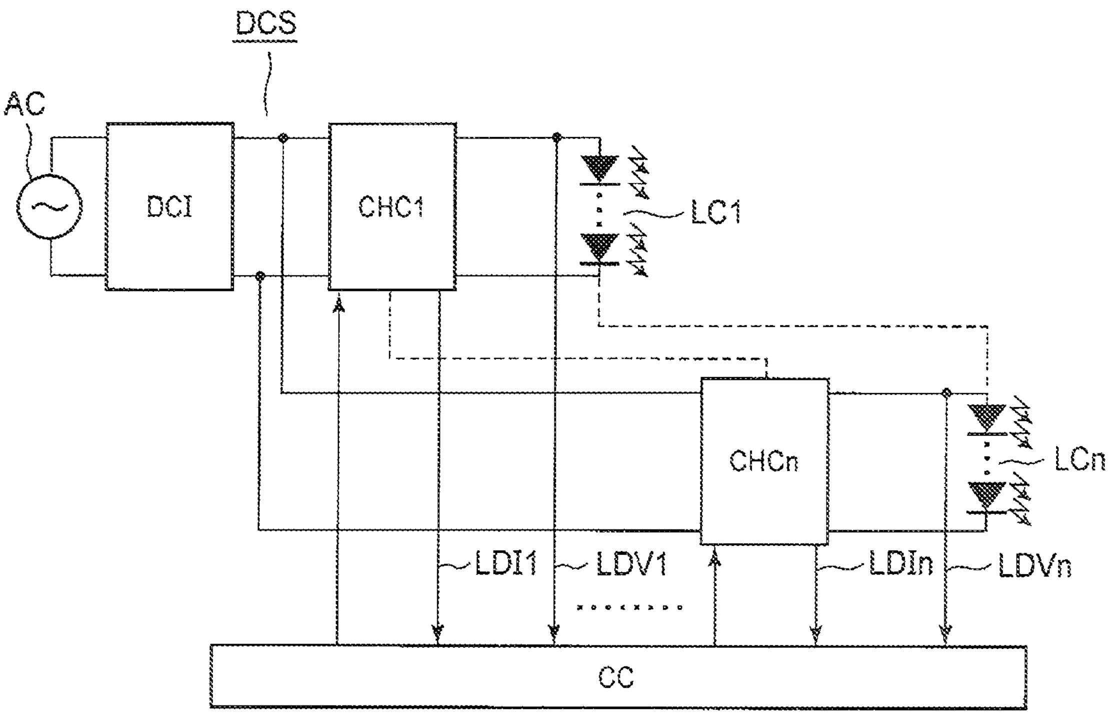
FIG. 5 is a circuit block diagram showing a DC power supply unit according to a fourth embodiment.

A fourth embodiment is explained with reference to FIG. 5. The same mark or symbol is given to the same portion as FIG. 3 and explanation about the portion is omitted. In this embodiment, the DC power supply source DCS is constituted by single DC input power supply source DCI and two or more chopper circuits CHC1-CHCn. Moreover, two or more load circuits LC1-LCn are arranged corresponding to the respective chopper circuits CHC1-CHCn with 1 to 1 relation. On the other hand, only one control device CC is provided, and is constituted so that the control is processed as using soft-ware That is, in this embodiment, the DC input power supply source DCI in the DC power supply source DCS is common to two or more chopper circuits CHC1-CHCn and load circuits LC1-LCn. The DCS input power supply source DCI is mainly constituted by the rectification circuit, and alternating current input terminals are connected to the alternating-current source AC. Moreover, the DC output terminal are connected to the input terminals of the chopper circuits CHC1-CHCn. Therefore, two or more chopper circuits CHC1-CHCn and load circuits LC1-LCn constitute the LED lighting equipments, and the DC power supply source DCS functions as a common power supply source to the plurality of LED lighting equipments. In addition, the chopper circuits CHC1-CHCn correspond to lighting circuits, if seen from the LED side of the load.

Accordingly, the chopper circuits CHC1-CHCn and load circuits LC1-LCn can be arranged in a position where a pair of the load circuit LC1 and chopper circuit CHC1 are adjacently arranged, for example. On the other hand, the DC input power supply source DCI can be arranged apart from the pair of the chopper circuit CHCn and the load circuit LCn, i.e., each LED lighting equipment, that is, in a position where the lighting, is not hindered by the DC input power supply source DCI.

Load voltage detection devices LDV1-LDVn and, load current detection devices LDI1-LDIn are provided in each of chopper circuits CHC1-CHCn as the load state detection device.

Figure 4:
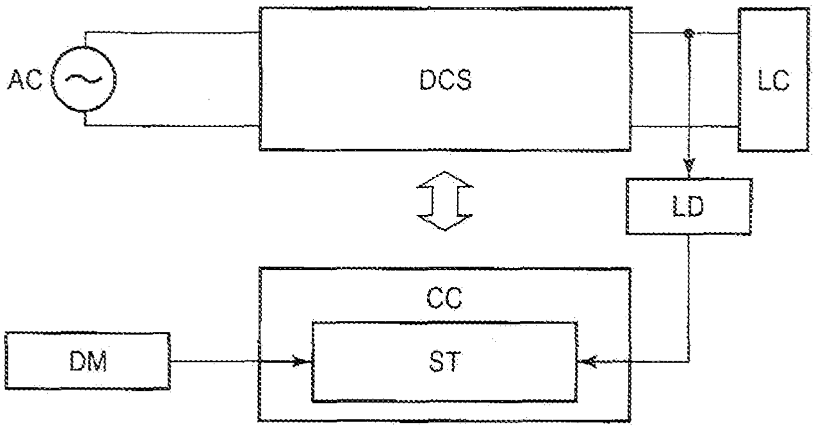
FIG. 4 is a circuit block diagram showing a DC power supply unit according to a third embodiment.

The control device CC, like the third embodiment shown in FIG. 4, the main portion is constituted by digital devices, such as a microcomputer and DSP, and controls the chopper circuits CHC1-CHCn and the load circuits LC1-LCn. Namely, the outputs of the load voltage detection device LDV1-LDVn, and load current detection device LDI1-LDIn as the load state detection device for each pair are inputted to the control device CC. Each of the chopper circuits CHC1-CHCn is controlled so that the voltage difference between the maximum output voltage of the DC power supply source DCS and the load voltage at the time of normal operation is always maintained constant.

According to this embodiment, since the arc discharge is not generated at the time of the open mode failure of the load circuit LC by providing the above-mentioned control device CC, unfavorable phenomenon resulting from the arc discharge, such as smoking and ignition, can be suppressed. However, in case the DC power supply source DCS is constituted by a directly linked circuit structure, for example, non-insulated type chopper circuit, voltage from the DC power supply source has been continuously outputted to the load at the time of above-mentioned failure. In this case, since the voltage difference between the maximum voltage of the DC power supply source DCS and load voltage at the time of normal operation, is controlled within the range of less than 20V, the DC power supply source operates without problem. However, people may contact carelessly the load circuit LC and the output terminal of the DC power supply source DCS, and there is a possibility of receiving an electric shock.

Therefore, it is preferable for the control device CC to have a safety circuit function in addition to the maximum voltage output control function. The maximum voltage output control function of this, embodiment is basically same as that of each embodiment explained above, and controls the maximum output voltage within the predetermined range by controlling the chopper circuit CHC1-CHCn in the DC power supply source DCS according to the control input signal from the load voltage detection devices LDV1-LDVn. However, unlike other embodiments, the practical control is separately judged and performed in each pair of the above-mentioned chopper circuits CHC1-CHCn and the load circuits. LC1-LCn in this embodiment.

Therefore, the safety circuit function can be added to the control device CC. In this embodiment, the control device CC functions at the time of open mode failure, and the load voltage detection device LD detects this failure and inputs a control signal into the control device CC. Then, the control device CC operates, and the DC power supply source is controlled. As a result, the control device CC controls and sets the maximum voltage outputted to the load circuit LC to a voltage higher by 20V than the load voltage at the time of normal operation.

Succeeding to the above operation, the safety circuit function of the control device CC is performed, and the DC power supply is stopped. In this case, if the suspending time is shorter than 1 second after the load voltage detection device detects the open mode, the suspension of the power supply does not result in problem. In order to suspend the DC power supply, if the DC power supply source DCS is constituted by the non-insulated type chopper circuit, it is preferable to stop an oscillation operation by a switching element of the non-insulated type chopper circuit. Thereby, the DC power supply source DCS is suspended. As a result, the output voltage is not supplied to the load circuit LC, and safety is defended.

The control device CC controls the DC power supply source DCS upon receiving control signals from the load current detection devices LDI1-LDIn so that the DC power supply source DCS performs separately the constant current control for each of the load circuits LC1-LCn. In addition, the above-mentioned safety circuit function is also applicable at the time of the open mode failure generated in the constant voltage control operation in which the large load current flows upon receiving the control signal.

The above-mentioned control device CC includes a memory device and is constituted so that the memory device may be used when performing the maximum voltage output control function. That is, the load voltage at the time of normal operation is stored in the memory device, for example, at the time of power ON. Then, the newly inputted load voltage is compared with the load voltage at the normal operation, which is read from the memory device, and the occurrence of the open mode failure is detected. Moreover, the excess voltage detection level can be set up based on the stored load voltage at the normal operation.

This embodiment is applicable at the time of generation of the open mode by not only detachment of the load elements of the load circuit such as LED itself, but internal terminals such as a connector, and further by loose connection of the connector. That is, when the load state detection device LD detects the open mode, the control device CC operates and controls the output voltage of the DC power supply source DCS so that the voltage difference between the maximum output voltage of the DC power supply source DCS and the load voltage at the time of normal operation falls within the predetermined range in which the arc discharge is suppressed. Since the arc discharge disappears almost momentarily even if the arc discharge is generated, the arc discharge stops substantially. Therefore, it can be beforehand prevented the open mode failure portion from generating heat, and progressing to danger, such as emitting smoke, unusual heating, and melt of the connector by the continuing occurrence of the arc discharge. Therefore, a DC power supply unit and LED lighting apparatus equipped with the DC power supply unit with safety can be supplied.

In addition, the structural elements shown in each embodiment are commonly used in other embodiments.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A DC power supply unit, comprising;

a DC power supply source;

a load circuit connected to an output end of the DC power supply source;

a load state detection device that detects a load voltage or an electric quantity corresponding to the load voltage; and a control device that controls a maximum output voltage of the DC power supply source upon receiving the detected output of the load state detection device so that the voltage difference between the maximum output voltage of the DC power supply source and the load voltage at the time of normal operation falls within a predetermined range in which are discharge is suppressed, the control device including a safety circuit that suspends the output from the DC power supply source subsequent to the maximum voltage output operation.

2. The DC power supply unit according to claim 1, wherein the predetermined voltage range is equal or less than 20V.

3. The DC power supply unit according to claim 1, wherein the control device includes a storage device that stores a load voltage at the time of normal operation, an excess voltage detection level setting device that sets the detected level of the excess voltage based on the stored load voltage at the time of normal operation, and an output voltage control device that controls the maximum output voltage of the DC power supply source so that the voltage difference falls within a predetermined range when the output voltage detected by the load state detection device exceeds the excess voltage detection level.

4. An LED lighting apparatus, comprising:

a main body;

an LED arranged in the main body; and a DC power supply unit including;

a DC power supply source;

a load circuit connected to an output end of the DC power supply source;

a load state detection device that detects a load voltage or an electric quantity corresponding to the load voltage; and a control device that controls a maximum output voltage of the DC power supply source upon receiving the detected output of the load state detection device so that the voltage difference between the maximum output voltage of the DC power supply source and the load voltage at the time of normal operation falls within a predetermined range in which are discharge is suppressed, the control device including a safety circuit that suspends the output from the DC power supply source subsequent to the maximum voltage output operation.

5. The LED lighting apparatus according to claim 4, where a the predetermined voltage range is equal or less than 20V.

6. The LED lighting apparatus according to claim 4, wherein the control device includes a storage device that stores a load voltage at the time of normal operation, an excess voltage detection level setting device that sets the detected level of the excess voltage based on the stored load voltage at the time of normal operation, and an output voltage control device that controls the maximum output voltage of the DC power supply source so that the voltage difference fails within a predetermined range when the output voltage detected by the load state detection device exceeds the excess voltage detection level.

* * * * *